United States Patent [19]

McTaggart

[11] 3,960,807
[45] June 1, 1976

[54] THERMOFORMED POLYESTER ARTICLES HAVING IMPACT RESISTANCE AND HIGH TEMPERATURE DIMENSIONAL STABILITY

[75] Inventor: Larry S. McTaggart, St. Paul, Minn.

[73] Assignee: Minnesota Mining and Manufacturing Company, St. Paul, Minn.

[22] Filed: Sept. 30, 1974

[21] Appl. No.: 510,451

[52] U.S. Cl. ............................... 260/40 R; 260/873
[51] Int. Cl.² ........................................... C08L 67/02
[58] Field of Search ............ 260/873, 40 R, DIG. 35

[56] References Cited
UNITED STATES PATENTS

| | | | |
|---|---|---|---|
| 3,405,198 | 10/1968 | Rein et al. | 260/873 |
| 3,429,854 | 2/1969 | Siggel et al. | 264/92 |
| 3,496,143 | 2/1970 | Siggel et al. | 264/92 |
| 3,504,080 | 3/1970 | Siggel et al. | 260/873 X |
| 3,562,200 | 2/1971 | Jones et al. | 260/40 R |
| 3,578,730 | 5/1971 | Herwig et al. | 260/873 |
| 3,657,389 | 4/1972 | Caldwell et al. | 260/873 |
| 3,706,699 | 12/1972 | Conix et al. | 260/873 X |

FOREIGN PATENTS OR APPLICATIONS

| | | | |
|---|---|---|---|
| 1,182,820 | 12/1965 | Germany | 260/873 |

OTHER PUBLICATIONS

Elwnyn Jones, "Thermoforming", Mod. Plast. Ency. 1970–1971, vol. 47: No. 10A (Oct. 1970) pp. 602 and 604.

*Primary Examiner*—Donald E. Czaja
*Assistant Examiner*—S. M. Person
*Attorney, Agent, or Firm*—Alexander, Sell, Steldt & Delahunt

[57] ABSTRACT

Shaped, thinwalled, thermoformed, heat-set polyester articles having a composition comprising polyester, 2–16% polymeric crack stopping agent, and at least 0.01% nucleating agent, exhibit relatively high temperature dimensional stability and impact resistance.

9 Claims, No Drawings

THERMOFORMED POLYESTER ARTICLES HAVING IMPACT RESISTANCE AND HIGH TEMPERATURE DIMENSIONAL STABILITY

Thermoplastic polyester materials have been used for the manufacture of a broad range of articles because of their strength and flexural characteristics and high temperature stability. Fabrics and films are among the more common articles produced with polyesters. Certain physical characteristics of polyesters in general have limited their use in certain processing areas such as injection molding. Polyesters generally must be heat set for the product to have a reasonable degree of heat stability, and this heat setting step adds greatly to the working time for heat stable polyester products. Especially when making shaped, thin-walled articles of manufacture, it is difficult to develop a full range of useful properties including high temperature dimensional stability, tensile strength and flexural strength.

Many different types of processes are avaliable for shaping thermoplastic articles, such as injection molding, embossing, extruding, and thermoforming. All of these processes have some similar aspects, but in general are significantly different from each other both in physical characteristics of the process itself and in the properties of the finished article. Injection molding requires the use of fluidized polymeric material (such as molten polymer or finely pelletized molding particles) injected into a shaped mold. There is very little in the process itself which orients or strengthens the polymeric material if it is capable of orientation. Embossing is the forceful impression of a surface design upon a preformed polymeric material, which will generally affect only the surface characteristics of the material embossed. Extrusion is the forced flow of conformable material through a shaped orifice, and is a very limited process in that the shapes which may be produced are substantially limited to elongate shapes with shaping in only two dimensions (the dimensions of the orifice). Thermoforming is the application of shaping pressure and heat to a preformed structure (generally a film or sheet formed by ordinary processing techniques) to give a desired, three-dimensional shape to the structure. Each of these processes tends to require different properties in the materials worked upon in order to obtain the best results from a given process.

This invention is related to the manufacture of inexpensive, shaped, thin-walled polyester goods having heat stability, tensile strength and flexibility.

This invention further relates to a thermoforming process for producing such thin-walled polyester goods.

This invention also relates to particular polyester compositions which are thermoformed to produce thin-walled polyester goods.

In general with polyester materials, higher molecular weights, as measured by increased intrinsic viscosities tend to display greater strength than lower molecular weight polyesters. When working with moderate and high molecular weight polyesters, higher crystallinity is used to increase tensile strength; however, flexural properties then diminish and the polyester become stiff and brittle. For any particular use of polyesters, therefore, the particular composition of materials and parameters must be carefully selected. The formulation of the polyester thermoforming composition used is especially critical to the practice of this invention and must contain at least three ingredients. The first ingredient is the polyester itself, the second is a crack-stopping agent, and the third is a nucleating agent.

The polyester materials themselves must be thermoplastic, crystallizable or crystalline, have a glass transition temperature ($T_g$) of at least 50° C. and a melting point of at least 150° C. The more preferred polyesters will have a melting point of at least 200° C. Many such polyesters are described in U.S. Pat. Nos. 2,891,928; 3,048,564; 2,974,122; 2,938,015; and 2,465,319. The most preferred polyester is polyethylene terephthalate.

The polyesters used in accordance with the practice of the present invention are obtained by known polymerization techniques from aromatic dicarboxylic acids, preferably the lower alkyl esters thereof such as the dimethyl ester of terephthalic acid. The aromatic dicarboxylic acid or its ester or anhydride is esterified or transesterified and polycondensed with a saturated diol such as ethylene glycol. The saturated diols are saturated aliphatic, cyclo-aliphatic, or aromatic diols, preferably the lower alkane-diols such as ethylene glycol. Polyethylene terephthalate and other film-forming polyesters within the definition are described in the art such as, for example, "Polyesters and Their Applications" by Bjorkstn et al., Reinhold Publishing Corp. (1956), pp. 199–207. Mixtures of aliphatic carboxylic acids and saturated diols may be used also, but the above described physical properties (i.e., melting point and glass transition temperature must be satisfied. Even some degree of three-dimensional bonding (cross-linking) may be tolerated as long as these physical properties are maintained in the polyester component.

The polyesters used in this thermoforming composition should also have at least a certain molecular weight in order to obtain desired flexural characteristics and for the crack stopping agent (later defined herein) to work effectively. The polyester comprises about 79–98% by total weight of the formulations used in the practice of this invention. A single polyester material need not be used, but copolyesters, blends, etc. may be used. In terms of its intrinsic viscosity (I.V.), the polyester should have an I.V. of at least about 0.75. Preferably, the minimum intrinsic viscosity will be about 0.80, and the most preferred polyesters will be at least 0.85. Polyesters are known to be thermoformed, as in the formation of packages for cold storage of food; however, these packages are consistently thermoformed from biaxially oriented sheets having an I.V. of from 0.55 to at most 0.70. Biaxially oriented materials cannot easily form articles having wall thicknesses of greater than 5 mils because of the great difficulty in drawing films of sufficient thickness to result in drawn products of those relatively large dimensions. These drawn films will also tend to shrink at elevated temperatures.

Scrap polyester material may also be used in forming the shaped compositions of this invention. Scrap polyester typically has an I.V. of 0.45–0.80 depending on the starting I.V. and the extent of thermal degradation in prior film or fiber processing. In the practice of this invention polyethylene terephthalate (PET) must be repolymerized to an I.V. of at least 0.75 to obtain any effect from the crack stopping agent with I.V.'s approaching 1.0 desired. Repolymerization is best accomplished by solid state polymerization (SSP) in which particles of resin are heated up to within 5°–10°F of their melting point while engulfed in a stream of heated inert gas. Polymerization rates of 0.05 I.V. unit/hr. or more are readily obtained.

It is important that the inert gas for scrubbing the reaction products be free of moisture and oxygen to obtain rapid polymerization rates and prevent development of an amber color in the resin.

The intrinsic viscosity of the polyester is a standard by which the degree of polymerization of the polyester is indicated and is a value that is defined by the formula $$[\eta] = \lim_{C \to 0} \frac{\ln Nr}{C}$$

where $Nr$ is the ratio at 30°C of the viscosity of a dilute solution of the polyester dissolved in trifluoroacetic acid to the viscosity of the trifluoroacetic acid itself and $C$ represents the concentration of the dilute solution, the unit being the number of grams of the polyethylene terephthalate in 100 cc of the solution.

Articles produced from low molecular weight (I.V. 0.50 or less) polyethylene terephthalate display poor mechanical properties and as the I.V. is increased, a general improvement is obtained. Unfortunately, even when I.V. is increased to levels that are impractical for processing, polyethylene terephthalate does not develop totally satisfactory fracture characteristics. Control of intrinsic viscosity alone does not yield satisfactory mechanical properties. Certain aspects of the solid state polymerization process utilized in this work are detailed in the following patents: U.S. Pat. Nos. 3,075,952; 3,344,091; and British Pat. No. 1,066,162.

A second component of these thermoforming polyester composition materials is a polymeric material which is blended with the polyester. This second polymeric material is a crack stopping agent. The crack stopping agent is a material which retards the growth, propogation or formation of cracks during mechanical failure of brittle polymers. Such failure readily occurs during handling by production apparatus and, in the case of food trays, during high speed stacking and transporting. There is much technology which has been developed in the use of these agents for particular effects upon polyesters, and the materials are commercially available. U.S. Pat. No. 2,405,198 describes polyethylene, polypropylene and poly(4-methylpentene) as improving impact strength; U.S. Pat. No. 3,361,848 additionally shows polyisopropylene, polybutene and polypentene for similar purposes. Other art of significant interest is U.S. Pat. Nos. 3,579,729 and 3,562,200 and articles such as "Two Phase Polymer Systems" by S. L. Posen, *Polymer Engineering and Science*, April, 1966 pp. 115–123 and *Polymer Structure Properties and Applications* by R. D. Deanin, Cahners Pub. Co., 1972. The additives discussed and reviewed therein function as crack stopping agents. This crack stopping agent should be present in at least 2% by weight of polyester up to 16% by weight of the total composition. The preferred range is 5–10% by weight. A preferred class of crack stopping agents are the polyolefin agents, especially polyethylene. The most preferred crack stopping agent is TPX (a registered trademark of I.C.I. and comprises poly-4-methylpentene-1).

Other classes of polymeric materials which are known to contain particular species useful as crack stopping agents are the polyamides (e.g., nylon-6,6), polycarbonates, polysulfones, certain polyesters, and natural and synthetic rubbers.

Crack-stopping agents are further defined by a simple test. A 20 mil polyester film material of substantially 100% polyethylene terephthalate having 35% crystallinity and 0.65 intrinsic viscosity is subjected to the flex test hereinafter defined. Any polymeric material which, when blended with the polyester film material in an amount 10% by total weight of the composition and formed into a film and subjected to the flex test, increases the flex life of the film by 20% is a crack-stopping agent in the practice of this invention.

The third necessary component of the polyester thermoforming composition is a nucleating agent. Nucleating agents are well known in the polyester art as materials which accelerate crystallization which is necessary to obtain thermal dimensional stability (see U.S. Pat. Nos. 3,361,848; 3,405,198; 3,562,200; 3,564,077; and 3,565,852; and Netherlands Pat. No. 65/11744). These nucleating agents may be, for example, talc, gypsum, silica, calcium carbonate, alumina, titanium dioxide, alumina and calcium silicate, pyrophylite, finely divided metals, powdered glass, carbon black, graphite, etc., individually or as mixtures of one or more. The minimum effective concentration is 0.01% by weight of polyester. The particle diameter should be less than 50 microns and is preferred below 10 microns. In the practice of this invention, titanium dioxide having a particle diameter of 0.2–3.5 microns is most preferred. The nucleating agent, as in the case of titanium dioxide may be used in sufficient quantities (past 5% of total weight) so that it acts as pigmentation for the composition as well as a nucleating agent. Separate coloring material may, of course, be added.

The nucleating agent may be used to an upper limit of 20% in the compositions thermoformed herein in the practice of this invention. It is preferred to use no more than 10% by total weight of the composition as the addition of materials above 10% and up to 20% does not improve the properties of the article, and to some degree adverse effects may be encountered such as increased brittleness. The 5% preferred limit is based upon the fact that the increasing amount of nucleating agents up to 10% do not significantly improve properties, although with the proper selection of nucleating agent the cost of the articles may be lowered. Both inorganic and organic nucleating agents as known in the art may be used as they are functionally equivalent, however, inorganic nucleating agents are preferred because of their generally lower costs.

The particular articles of manufacture which this invention concerns are thin-walled thermoformed polyester articles. By thin-walled it is meant that the articles may not have a thickness exceeding 40 mils. In a preferred embodiment of this invention, the wall thickness should not be greater than 25 mils. These thin-walled articles are formed from preformed film materials which are shaped under heat and pressure to conform to a desired form. In particular, the thin-walled articles of this invention are shaped meaning that the thermoforming process causes at least 10% and preferably at least 20 or 25% of the weight of the starting sheet composition to deform out of the plane of the starting sheet. This invention is particularly suitable for the manufacture of thin-walled trays having a generally flat interior or central portion and a raised enclosing edge portion to surround and restrain materials placed on the interior. The transition from the center to the raised portion may be a sharply defined right angle corner, but is preferably a smooth arcuate transition. The sheet is deformed such that the edge area is higher at every point then the central area, and there are no seams or welds on the edge. In the formation of trays, particular design features such as raised partitions in the central portion of the tray or container may be formed as desired by selecting the appropriate thermoforming mold.

The trays or cartons formed in the practice of this invention find particularly good utility as containers for food to be heated in hot air, steam, autoclave, infrared, or microwave ovens because of their ability to retain dimensional stability at high temperatures.

The trays presently in general use suffer from a number of deficiencies which render them unsatisfactory for at least some of the potential uses for food trays. Three major classes of materials are used for forming trays, simple thermoplastic materials (e.g., polyethylene, polypropylene, polystyrene, and polyvinyl chloride), aluminum sheeting, and thermoset resins (e.g., the melamines). The thermoplastic materials may be used only for limited temperature ranges (usually not higher than 100°C) before their dimensional stability diminishes, even though these materials have sufficient impact strength for mechanical handling. Aluminum tends to have sharp edges, dents easily, and cannot be used in microwave apparatus. The thermoset resins especially the widely used melamines, have poor impact strength, are brittle, tend to give off odors when heated and are rather expensive. The thermoformed polyester compositions of this invention suffer from none of the above-mentioned deficiencies.

In the formation of thin-walled shaped articles having any significant deviation from a planar form, and even when forming thin-walled sheets of polyesters, injection molding is an unsatisfactory technique. the injection molding process itself acts to produce properties in the article which are not desirable. For example, because the surface areas of the opposite faces of the mold must be relatively close in forming articles of less than 40 mils, especially below 30 mils, differential cooling of the polymeric material causes layering within the article. This produces a lack of uniform properties and creates intolerable lines of weakness at the interphase of the layers. The surfaces closest to the nozzle solidify first, cooling even during that part of the process when polymeric material is still being forced into the mold. This causes the layering as well as the formation of flow patterns and lines of stress in the product which tend to give undesirable directional mechanical properties to the product. For example, upon impact hardness testing, injection molded thin-walled polyester materials will generally tend to crack along the flow lines retained in the material from their manufacture. These problems have been found to be obviated in the formation of thin-walled polyester materials through the use of thermoforming processes.

The following tests were performed in order to show the differences in physical properties between thin-walled materials formed by thermoforming and thin-walled materials formed by injection molding. All weight percentages are based on the total weight of the composition.

EXAMPLE 1

Two polyester thermoforming compositions were formulated. Composition A comprised 94 parts of an ethylene glycol dimethyl terephthalate polyester, 5% by total weight "TPX" and 1% TiO$_2$. Composition B comprised 89% of the polyester, 10% "TPX" and 1% TiO$_2$. Test samples of each of these compositions were formed by injection molding and thermoforming. The samples were injection molded into 3 inch discs having a thickness of 20 mils by preblending the components and melting them in the barrel of an injection molder. The injection molder was set at an injection cycle of 8 seconds. The mold was operated at a temperature of 149°C and the discs were held in the mold for 1 minute. The 3 inch thermoformed discs were produced by thermoforming trays from an extruded sheet of these compositions, and cutting discs from the flat bottom section of the trays. The extruded film, a 20 mil sheet, was heated to 121°C and thermoformed with applied vacuum in a rectangular aluminum mold having 5 × 8 × 1 inch width, length and depth dimensions respectively. The mold temperature was raised to 149°C and the thermoformed tray was restrained in the mold with vacuum for 1 minute. These discs, differing only in their process of manufacture were then subjected to procedures to test the physical properties of the discs.

The testing procedure was ASTM D–2176–69 with 1.5 kg loading. The jaws were spaced to accommodate the thickness used during the test. The test procedure is to repeatedly flex the film 135° in one direction and then the other direction to constitute a single flex. The flex number indicates the number of flexes to break. This test is also known as the M.I.T. fold endurance test. The results are tabulated below.

| Composition | Injection Molded Aging | Flexes to Break | Composition | Thermoformed Aging | Flexes to Break |
|---|---|---|---|---|---|
| A | 204°C for 60 mins | all samples broke or cracked on first flex | A | 204°C for 60 mins | 11,468 9,853 10,902 10,864 5,888 13,909 10,864 |
| A | not aged | all samples broke or cracked on first flex | A | not aged | 7,882 1,003 11,314 4,323 33,902 15,397 |
| B | 204°C for 60 mins | all samples broke or cracked on first flex | B | 204°C for 60 mins | 1,872 6,816 9* 1,965 9,093 1,403 |
| B | not aged | 883 14 2,157 | B | not aged | 7,512 37,152 6,523 11,735 63,568 10,895 38,549 |

*It is believed that faulty test procedures led to this extreme value.

It can readily be seen from the above data that the thin-walled articles of those compositions produced by thermoforming show a substantially improved flex-life when compared to thin-walled articles produced by injection molding.

EXAMPLE 2

The impact properties of the 20 mil thick discs produced by the two different processes were examined according to the following test procedures.

The impact specimens were clamped between two 5 × 6 inch metal plates ⅛ inch thick which had a 2 ½ inch diameter circle cut from their centers. The specimens were centered about the holes and steel balls dropped onto the center of the exposed specimens. The size of the steel ball and the height from which the ball was dropped to produce failure were recorded. Because of size limitations in the testing apparatus, the greatest impact which could be demonstrated was a 1 ⅝ inch steel ball dropped from a height of 21 inches. The testing results were as follows:

detail. The sheet was cut to 9 × 9 inch dimensions, placed in vacuum former, heated to 121°C and vacuum formed into the 5 × 8 × 1 inch oval shaped dish. The armorphous dish was restrained with vacuum in the same mold at a temperature of 149°C for 1 minute to effect crystallinity. A four oz. piece of precooked chicken and four oz. of corn were packaged in a number of trays and were frozen at −18°C. Later, trays were removed from the freezer and dropped repeatedly to

| | Injection Molded | | | | Thermoformed | | |
|---|---|---|---|---|---|---|---|
| Comp. | Aging | Ball* inches diam. | Height inches | Comp. | Aging | Ball* inches diam. | Height inches |
| A | none | 1½ | 6 | A | none | no breakage occurred in any thermoformed specimen with 1½" or 1⅝" balls dropped from 21 inches | |
| | | ¾ | 11 | | | | |
| | | ½ | 21 | B | none | | |
| B | none | ¾ | 11 | | | | |
| | | ½ | 21 | A | 400°F 60 min. | | |
| A | 400°F 60 min. | ¾ | 11 | | | | |
| | | ½ | 21 | B | 400°F 60 min. | | |
| B | 400°F 60 min. | ¾ | 11 | | | | |
| | | ½ | 21 | | | | |

*Ball weights:
1⅝ inches, 286.5 gm; 1½ inches, 205.5 gm; ¾ inch, 18.7 gm; ½ inch, 8.3 gm.

Again it can be readily seen that the thermoformed specimens displayed substantially better impact resistance than the injection molded specimens.

In thermoforming the compositions used in this invention, ordinary thermoforming techniques known in the art may be used. The temperatures, pressures and processing times are dependent upon the properties desired in the final article. For certain compositions, a minimum temperature of 50°C may be used, although higher temperatures are generally preferred. In the most preferred composition used in the practice of this invention (polyethylene terephthalate, poly-4-methylpentene-1, and TiO₂), temperatures on the order of 121°C are preferred. The upper temperature limit is the melting point of the thermoforming composition.

After the forming process, the article is annealed or heat-set under restraint. The annealing or heat-setting is the known technique of heating the article so as to develop the crystallinity. This is performed while the article is restrained, preferably in the mold itself, so that its desired shape is maintained. This heat setting must be done at least 93°C and preferably between 135°C–190°C. The heat setting conditions should be selected on the basis of the appropriate degree of crystallinity desired. With the preferred composition of this invention 135°C–190°C for 3 minutes to 20 seconds respectively are effective conditions.

EXAMPLE 3

100 lbs. of polyethylene terephthalate with an I.V. of 0.77 was placed in a chamber and heated in a fluid bed at 246°C with a dry nitrogen gas stream. Heating was continued for eight hours after which the resin was cooled to room temperature while still in the inert gas stream. The I.V. of the solid state polymerized resin was 1.26. After appropriate drying, 10% ICI TPX (RT-18) and 1% TiO₂ (TiPure R-900) were blended with 89% of the polyethylene terephthalate resin and extruded into 20 mil sheet of 9 inch width.

The sheet was rapidly quenched to prevent any crystallization which requires greater force at the time of forming and limits the depth of draw and replication of the floor from a distance of four feet with no apparent damage to the dish. Additional dishes were reconstituted in conventional ovens at an oven setting of 190°C for 30 minutes and in a microwave oven for 3 minutes to attain a serving temperature of 65°C. The food was palatable and no undesirable effects were observed for the oven dishes.

I claim:

1. A shaped, thin-walled, thermoformed, heat-set polyester article the composition of which comprises:
    A. a thermoplastic, crystallizable, polyester having a glass transition temperature of at least 50°C and a melting point of at least 149°C and an intrinsic viscosity of at least 0.75,
    B. from 2–16% of a polymeric crack stopping agent, and
    C. from 0.01% to 20% by weight of a nucleating agent.

2. The polyester article of claim 1 wherein the polyester is polyethylene terephthalate.

3. The polyester article of claim 2 wherein the crack stopping agent is a polyolefinic material.

4. The polyester article of claim 2 wherein the crack stopping agent comprises poly-4-methylpentene-1.

5. The polyester article of claim 4 wherein the nucleating agent is titanium dioxide in a concentration of 0.01% to 5% by weight of the composition.

6. The polyester article of claim 1 having the shape of a tray with a generally flat central portion and raised edges.

7. The polyester article of claim 5 having the shape of a tray with a generally flat central portion and raised edges.

8. A method of producing the article of claim 1 which comprises blending components A, B, and C, forming a sheet from the blended components, and thermoforming the sheet into its desired shaped, and heat-setting the formed product.

9. The polyester article of claim 1 having a thickness of 10–40 mils.

* * * * *